United States Patent

[11] 3,575,436

| [72] | Inventor | Raymond E. Templeton<br>Rte. 2, Box 766, Peoria, Ariz. 85345 |
|---|---|---|
| [21] | Appl. No. | 678,423 |
| [22] | Filed | Oct. 26, 1967 |
| [45] | Patented | Apr. 20, 1971 |

[54] BASKET-CARRYING FRAME FOR THREE-WHEELED VEHICLES
1 Claim, 4 Drawing Figs.
[52] U.S. Cl. ..................................................... 280/7.15,
280/202, 224/32
[51] Int. Cl. ..................................................... B62k 13/04,
B62j 7/04
[50] Field of Search .......................................... 280/7.1,
7.15, 202, 289; 224/32, 32 (.1)

[56] References Cited
UNITED STATES PATENTS

| 3,229,988 | 1/1966 | Mansperger .................. | 280/7.15 |
|---|---|---|---|
| 3,368,823 | 2/1968 | Templeton .................... | 280/7.15 |

FOREIGN PATENTS

| 495,284 | 11/1938 | Great Britain ................ | 280/202 |
|---|---|---|---|

*Primary Examiner* — Leo Friaglia
*Assistant Examiner* — Milton L. Smith
*Attorney* — Drummond, Cahill & Phillips ABSTRACT: A basket-carrying frame for three-wheeled vehicles comprising a frame for converting a bicycle to a tricycle which includes an auxiliary frame having two pairs of forks disposed in straddling relation with two rear wheels of a converted bicycle, said auxiliary frame also comprising a pair of horizontally disposed crossmembers disposed between the said pairs of forks, said crossmembers being substantially on a common plane to support the bottom portion of a luggage basket, or the like.

Patented April 20, 1971

INVENTOR.
RAYMOND E. TEMPLETON
BY
*Wm. H. Dean*

Patented April 20, 1971

INVENTOR.
RAYMOND E. TEMPLETON
BY
Wm. H. Dean

BASKET-CARRYING FRAME FOR THREE-WHEELED VEHICLES

BACKGROUND OF THE INVENTION

Various auxiliary frames for three-wheeled vehicle have been utilized, and particularly in connection with bicycles which have been converted to tricycles. Many of these frames such as disclosed in U.S. Pat. No. 3,368,823 have employed various devices for supporting baskets, or luggage boxes, however, the attachment of such baskets or boxes have been either complicated or relatively expensive, and in many instances, the baskets or boxes have been improperly supported due to a lack of suitable supporting crossmembers below or upon which the baskets or boxes may properly rest.

SUMMARY OF THE INVENTION

This invention relates to a basket-carrying frame for three-wheeled vehicles, and more particularly, to a basket-carrying frame for three-wheeled vehicles which may be used in the conversion of a conventional bicycle to a tricycle.

Said present basket-carrying frame of the invention comprises a novel auxiliary frame for tricycles converted from conventional bicycles. This auxiliary frame includes two pairs of forks, each pair straddling a respective wheel, the forks interconnected by a pair of horizontal crossmembers disposed on a substantially common plane to support the bottom of a luggage basket, box or any other similar utility carrier. This arrangement of the horizontal bars or members of the auxiliary frame not only reinforces the pairs of forks in their assembled relation to each other, but also in their connection with a conventional bicycle frame, and also economizes upon the materials required for the frame for efficiently supporting a luggage basket or carrier.

Accordingly, it is an object of the present invention to provide a novel basket-carrying frame for three-wheeled vehicles, and more particularly, three-wheeled vehicles which have been converted from two-wheeled bicycles.

Another object of the invention is to provide a novel basket-carrying frame for three-wheeled vehicles comprising two pairs of forks having a pair of horizontally disposed interconnecting bars which interconnect the pairs of forks; the bars being on substantially a common plane and disposed efficiently to support the bottom of a luggage basket or other carrier.

Further objects and advantages of the invention may be apparent from the following specification, appended claims, and accompanying drawings:

DESCRIPTION OF THE PREFERRED EMBODIMENTS

Figures 1, 2:
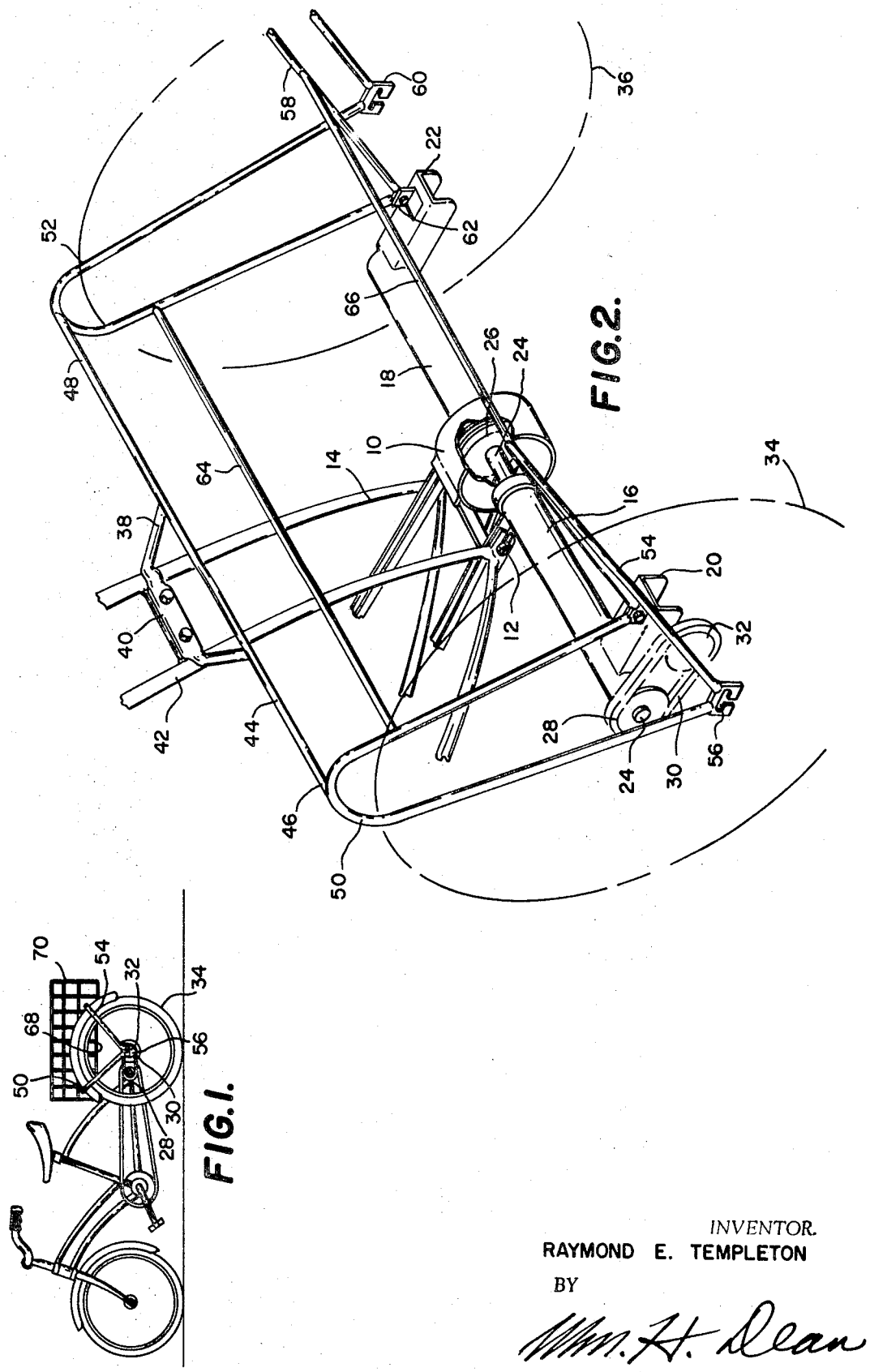
FIG. 1 is a side elevational view of a basket-carrying frame for three-wheeled vehicles, and shown in connection with a three-wheeled vehicle all in accordance with the present invention.
FIG. 2 is an enlarged perspective view of a basket-carrying frame for three-wheeled vehicles, and showing portions of a three-wheeled vehicle conversion frame in connection with a rearward frame portion of a conventional bicycle.
Figure 3:
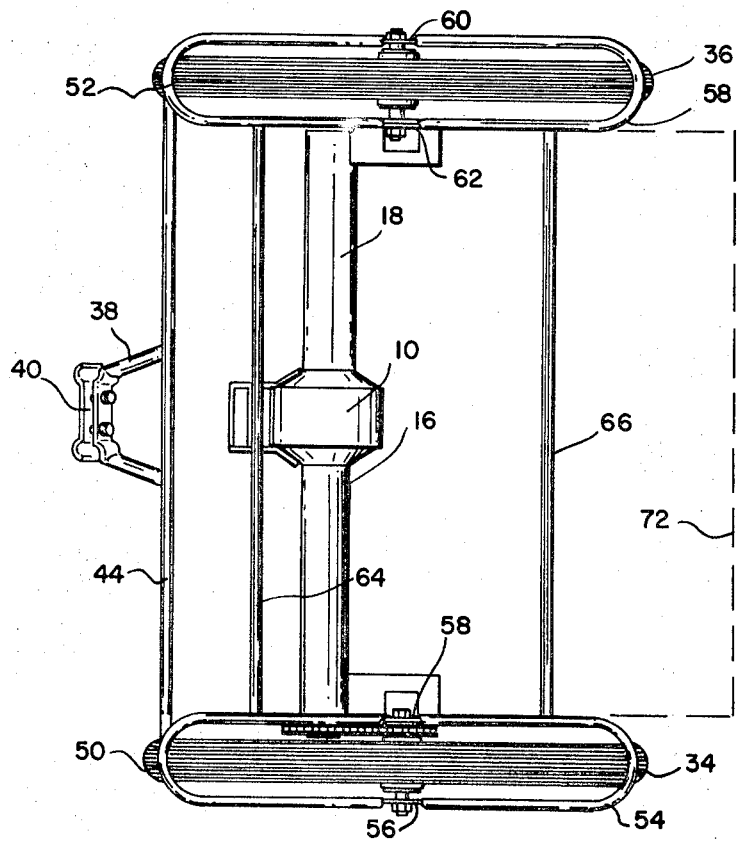
FIG. 3 is a reduced top or plan view of the structure shown in FIG. 2.
Figure 4:
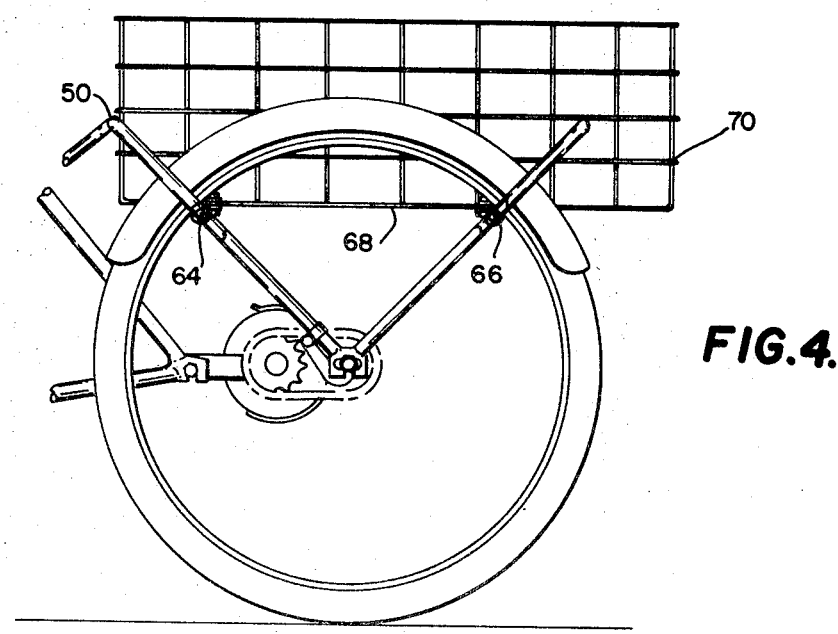
FIG. 4 is an enlarged fragmentary side elevational view similar to that as shown in FIG. 1.

As shown in FIGS. 2, 3 and 4 of the drawings, the present invention comprises a substantially yoke-shaped housing 10 having forwardly directed fixture portions 12 adapted to be secured to the conventional rear axle forks of a conventional bicycle frame, designated 14. The housing or yoke 10 is provided with oppositely directed hollow tubular axle housings 16 and 18 which are provided with laterally extending brackets 20 and 22, respectively, near their opposite ends. Rotatably mounted in the hollow tubular housing 16 is a drive shaft 24 having a sprocket 26 adapted to be driven by a conventional bicycle drive chain. The shaft 24 on its opposite end carries a sprocket 28 engaging an auxiliary chain 30 which also engages a conventional coaster brake or rear wheel hub sprocket 32.

A conventional bicycle rear wheel 34 is drivably connected to the sprocket 32 and the axle of this rear wheel 34 is mounted on the bracket 20.

A conventional bicycle front wheel 36 has its axle mounted on the bracket 22, and a bicycle is thus converted to a three-wheeled vehicle.

An auxiliary frame of the invention is provided with a coupling means 38 in the form of a clamp structure adapted to clamp a rearward portion 42 of a conventional bicycle frame, thus fixing the auxiliary frame of the invention to the conventional bicycle frame. The coupling means 38 is secured to a first cross bar 44 having opposite ends 46 and 48 welded or otherwise secured to forward forks 50 and 52 which straddle the wheels 34 and 36, respectively. The fork 50 is one of a pair of forks which includes a rearward fork 54, the forks 50 and 54 constituting a pair and secured together at 56 on the respective wheel axle. Opposite ends of the pair of forks are secured at 58 to the respective brackets 20.

The forks 52 and another rearward fork 58 constitute a second pair of forks which straddle the wheel 36, and these forks are secured together at 60 on the axle of the wheel 36, and at 62 on the bracket 22.

Second and third crossmembers 64 and 66 interconnect the forward forks 50 and 52 and the rearward forks 54 and 58, respectively. These crossbars 64 and 66 are disposed on substantially a common horizontal plane, as shown best in FIG. 4 of the drawings, and support a lower portions 68 of a basket 70 which may be a utility mesh basket, as shown, or may be a box, if desired. It will be seen that the crossbars 64 and 66 are substantially below uppermost portions of the forks 50, 52, 54 and 58, and provide a secure support for the utility basket 70. Additionally, these crossbars rigidly interconnect the pairs of forks, as shown in FIG. 2 of the drawings, and permit a wide basket, such as indicated by broken lines 72 in FIG. 3, to be disposed between the pairs of forks and the respective wheels 34 and 36.

The crossbars 64 and 66 thus provide very desirable supports for a utility basket or box which may also contain passenger seats for youngsters or may contain various other articles which may be transported in connection with the three-wheeled vehicle disclosed in the drawings.

It will be obvious to those skilled in the art that various modifications of the present invention may be resorted to without departing from the spirit of the invention.

I claim:

1. In a means for converting a bicycle to a tricycle, the combination of: a conversion frame having a pair of axially aligned tubular members provided with adjacent inner ends spaced apart; a yoke means rigidly interconnecting said inner ends of said tubular member; a connecting bracket means secured to said frame in the proximity of said yoke and extending forwardly and adapted to be secured to conventional rear wheel connecting forks of a bicycle, said tubular members having outer ends; a conventional rear bicycle wheel having a hub; said hub having a conventional axle; said axle at one end thereof secured to said one of said tubular members; a conventional bicycle front wheel having a conventional axle connected to another of said tubular members; a drive shaft generally in one of said tubular members; said drive shaft having a sprocket disposed on its inner end and located in the proximity of said yoke and disposed to be engaged by a conventional bicycle drive chain; said hub drivingly connected to said drive shaft; an auxiliary frame assembly comprising two pairs of forks each having a pair of forward and rearward forks; the forks of each pair straddling one of said wheels and fixed together and to one of said axles at one side of respective wheel; each fork of each pair disposed at an angle to the other fork of each pair about the respective wheel axis; a first crossbar interconnecting the forward forks of both pairs; coupling means of said auxiliary frame adapted to be connected with a bicycle frame above the rear wheel connection portions of the conventional bicycle frame; said coupling means being connected to said first crossbar and second and third crossbars disposed and interconnecting said forward and rearward forks of both pairs of forks, respectively, said second and third crossbars both disposed at a level below upper portions of said forks and disposed generally on a common horizontal plane, considerably below the upper portions of said wheels, to support the bottom of a basket, or the like, between said wheels.